US006477956B1

(12) United States Patent
Rea et al.

(10) Patent No.: US 6,477,956 B1
(45) Date of Patent: Nov. 12, 2002

(54) INK CARTRIDGE WITH SELF-CLOSING VALVE

(75) Inventors: Keith R. Rea, Florence, SC (US); James F. Kick, Town & Country, MO (US)

(73) Assignee: Sonoco Development, Inc., Hartsville, SC (US)

(*) Notice: Subject to any disclaimer, the term of this patent is extended or adjusted under 35 U.S.C. 154(b) by 0 days.

(21) Appl. No.: 09/928,217

(22) Filed: Aug. 10, 2001

(51) Int. Cl.[7] .............................. B41M 5/00; B41J 2/17; B41J 2/175; B41J 29/30; G01D 11/00

(52) U.S. Cl. ........................... 101/466; 347/84; 347/85; 347/86; 347/87; 347/95; 347/100; 347/108

(58) Field of Search ............................ 101/466; 347/84, 347/85, 86, 95, 100, 108, 87

(56) References Cited

U.S. PATENT DOCUMENTS 4,513,784 A 4/1985 Farrand et al.
4,677,447 A 6/1987 Nielsen
5,606,988 A 3/1997 Pawlowski, Jr.
5,721,577 A 2/1998 Ostermeier et al.
5,896,151 A 4/1999 Miyazawa et al.
6,000,788 A 12/1999 Iida
6,145,973 A 11/2000 Wu et al.
6,172,694 B1 1/2001 Droege et al.
6,193,364 B1 2/2001 Iida
6,302,531 B1 * 10/2001 Usui et al. .................... 347/86
6,325,848 B1 * 12/2001 Usui .......................... 347/30
6,332,481 B1 * 12/2001 Shinada et al. ............... 141/18

* cited by examiner

*Primary Examiner*—Andrew H. Hirshfeld
*Assistant Examiner*—Marvin P. Crenshaw
(74) *Attorney, Agent, or Firm*—Bullwinkel Partners, Ltd.

(57) ABSTRACT

An improved ink cartridge of the type used to dispense ink in automatic lithographic presses. The ink cartridge comprises a hollow cylindrical body for holding a supply of extrudable ink, a plunger and a dispensing fitment. The improvement comprises a valve member mounted over a central aperture in the dispensing fitment and a flexible molded plastic spring that biases the valve member in the closed position. The valve member opens when subjected to pressure from the ink and closes automatically and completely when the ink pressure is less than the biasing force of the flexible spring.

9 Claims, 2 Drawing Sheets

FIG. 1
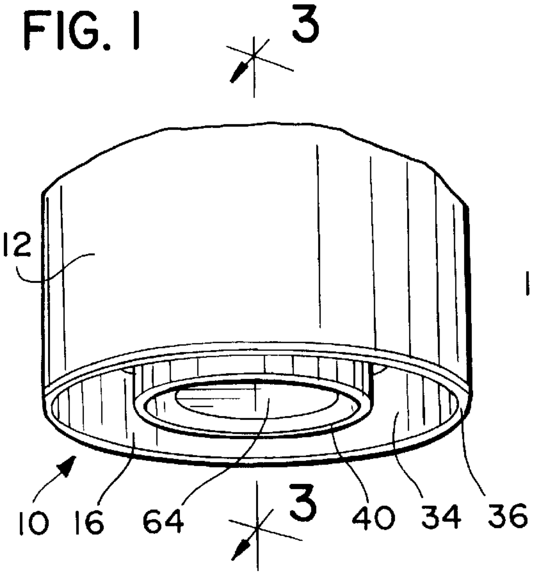
FIG. 2
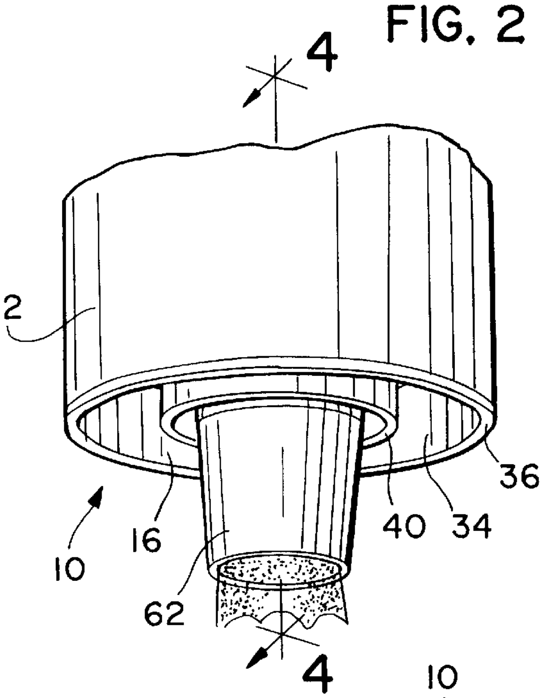
FIG. 3
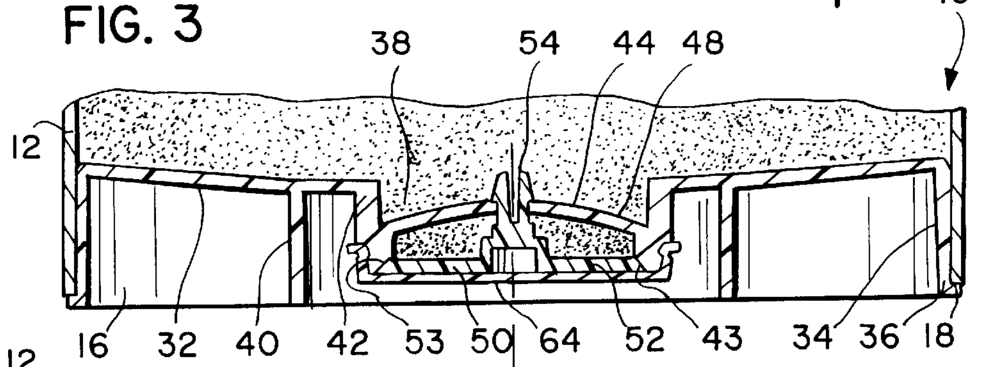
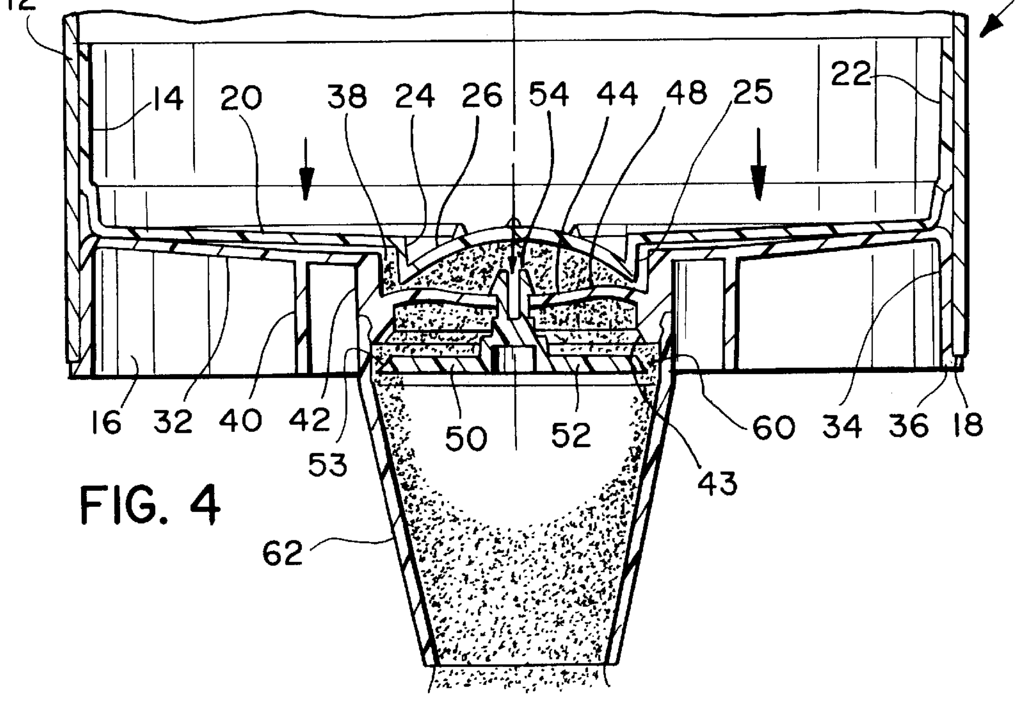
FIG. 4

INK CARTRIDGE WITH SELF-CLOSING VALVE

BACKGROUND

1. Field Of The Invention

This patent relates to liquid dispensing cartridges for automated dispensing systems. More specifically, this patent relates to an ink cartridge with self-closing valve for use with automatic lithographic presses.

2. Description Of The Related Art

Lithography is a printmaking process dating back to the 1700s in which ink is applied to a plate having both image and non-image areas. The image areas are ink-receptive and water-repellent. The non-image areas are water-receptive and ink-repellent. In rotary type lithographic presses the ink plate is mounted on a cylinder that rotates during printing. In one typical configuration, the plate cylinder picks up the ink at the image areas and transfers the image to a blanket cylinder, which then transfers the image to the paper. In multi-color sheet-fed type lithographic presses, multiple inking stations are placed in series. Each station has its own ink feeding system and handles a separate color. As the paper sheet moves from station to station, a new color is put down at each station.

Because lithographic ink is thixotropic, conventional lithographic ink feeding systems require a complex system of drums, vibrators and fountain rollers to handle and dispense the highly viscous ink. In a typical lithographic ink feeding system, workers remove the ink from a drum (or, in some cases, small tins) with specially made spatulas and spread the ink across a tray (the ink fountain). Fountain rollers roll against the ink fountain to pick up the ink and transfer it to the plate cylinder. The process is labor intensive and subject to error.

It is also difficult to store and reuse lithographic ink in drums. The ink is prone to oxidation which can result in color variations from one press run to another, and even from sheet to sheet within a single run. In addition, upon exposure of the ink to the atmosphere, volatile organic compounds (VOCs) evaporate, which can cause ink spoilage.

Some modern lithographic printers use specially designed cartridges to dispense ink, such as that described in Rea et al. U.S. Pat. No. 6,192,797. These cartridges are much smaller than drums, being typically nine to thirteen inches long and about three and a half to five inches in diameter. During printing, the ink cartridge moves back and forth across the fountain, dispensing ink into a fountain trough or directly onto an ink form roller. In automated presses, the amount of ink in the trough is continually monitored and replenished as needed.

Ink cartridges can be easily filled, transported, used and reused. The cartridge minimizes exposure of the ink to the atmosphere and also minimizes the amount of residual ink left in the cartridge after use.

Ink cartridges typically comprise a hollow cylindrical body, a plunger at one end and a dispensing fitment at the opposite end. The cylindrical body is filled with ink. The plunger can move axially within the cylindrical body. The ink is extruded from the dispenser when the plunger is forced toward the dispensing end by, for example, mechanical or pneumatic pressure.

The dispensing fitment is mounted in sealing engagement within the dispensing end of the cylindrical body and typically has a valve for opening and closing the cartridge. In the ink cartridge described in U.S. Pat. No. 6,192,797, the valve is recessed below the rim of the cartridge so it does not become damaged during shipment and storage. However, the valve must be manually opened to allow ink to flow, which is time consuming and can lead to error. In addition, valves that stay open until manually closed work poorly with lower viscosity inks because of their tendency to"drool." This is particularly troublesome in the United States, where inks are made with varying degrees of viscosity. A number of automatic valves have been tried that open and close in response to pressure from the ink, but they tend to remain open when the pressure is decreased, thereby allowing ink to continue to be extruded.

Thus there exists a need for an ink cartridge dispensing valve that opens when subjected to pressure from the ink and closes automatically and completely when the pressure is decreased below a certain predetermined level, even when used with lower viscosity inks. The present invention satisfies this need.

SUMMARY OF THE INVENTION

The present invention is an improved ink cartridge of the type used to dispense ink in automatic lithographic presses. The ink cartridge comprises a hollow cylindrical body for holding a supply of extrudable ink and has a plunger end and a dispensing end. The plunger end is closed by a plunger adapted to act as a piston within the cylindrical body to extrude the contents of the dispenser when the plunger is forced toward the dispensing end by mechanical or pneumatic pressure. The dispensing end is closed by a dispensing fitment affixed to the cylindrical body by glue or other suitable means. The improvement comprises a valve member mounted over a central aperture in the dispensing fitment, the valve member being adapted to open when subjected to pressure from the ink and close automatically and completely when the pressure is decreased below a certain predetermined level.

In the improved ink cartridge, a substantially cylindrical nozzle extends from the periphery of the dispensing fitment aperture and terminates in a rim. The nozzle defines a substantially cylindrical space. A flexible molded plastic spring is mounted within the cylindrical space and urges the valve member against the nozzle rim. The spring is bowed rearward in the direction of the plunger when the valve member is in the closed position. The spring has openings to accommodate the flow of ink through or around the spring.

The valve member is located downstream of and supported by the spring. The valve member is moveable between a closed position in which the valve member is urged against the nozzle rim by the biasing force of the spring, and an open position in which the valve member is raised above the nozzle rim to create an annular opening when pressure applied by the ink to the spring and to the valve member exceeds the biasing force of the spring.

In one embodiment, the valve member comprises a substantially flat disk-shaped portion and prongs extending upward from the disk-shaped portion and through a hole in the spring to secure the valve member to the spring.

The plunger comprises a substantially circular disk portion and a sidewall extending from the periphery of the disk portion in a direction away from the dispensing fitment. Preferably, the plunger includes an annular ring protruding from the circular disk portion in the direction of the dispensing fitment. The annular ring has a cylindrical outer wall and a concave inner wall and is adapted to fit around the valve member prongs and within the space defined by the nozzle to minimize ink left in the cartridge when the plunger is fully depressed.

THE DRAWINGS

FIG. 1 is a perspective view of an ink cartridge and dispensing fitment according to the present invention, shown with an optional shipping and storage cap mounted over the valve;

FIG. 2 is a perspective view of the ink cartridge and dispensing fitment of FIG. 1, shown with an optional nozzle extension mounted over the valve and the valve in the open position;

FIG. 3 is a cross-sectional view of the ink cartridge and dispensing fitment of FIG. 1 taken along line 3—3;

FIG. 4 is a cross-sectional view of the ink cartridge and dispensing fitment of FIG. 2 taken along line 4—4;

DETAILED DESCRIPTION OF THE INVENTION

Figure 5:
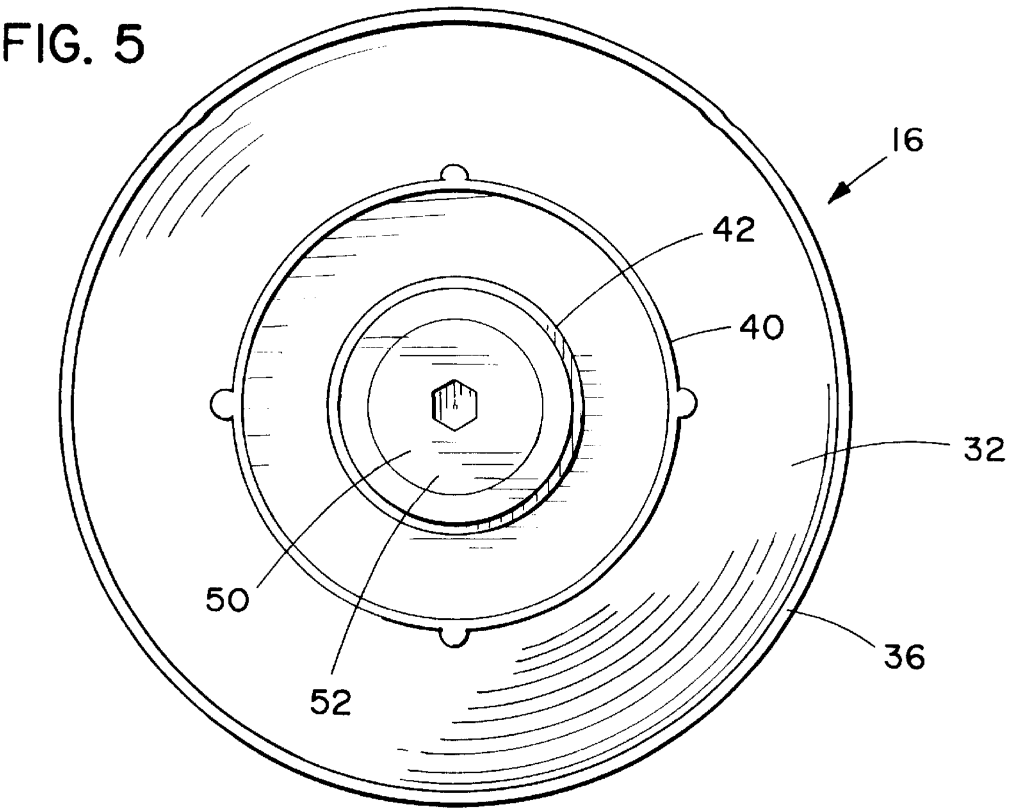
FIG. 5 is top planar view of the dispensing fitment of FIG. 1, shown with the storage and shipping cap removed.
Figure 6:
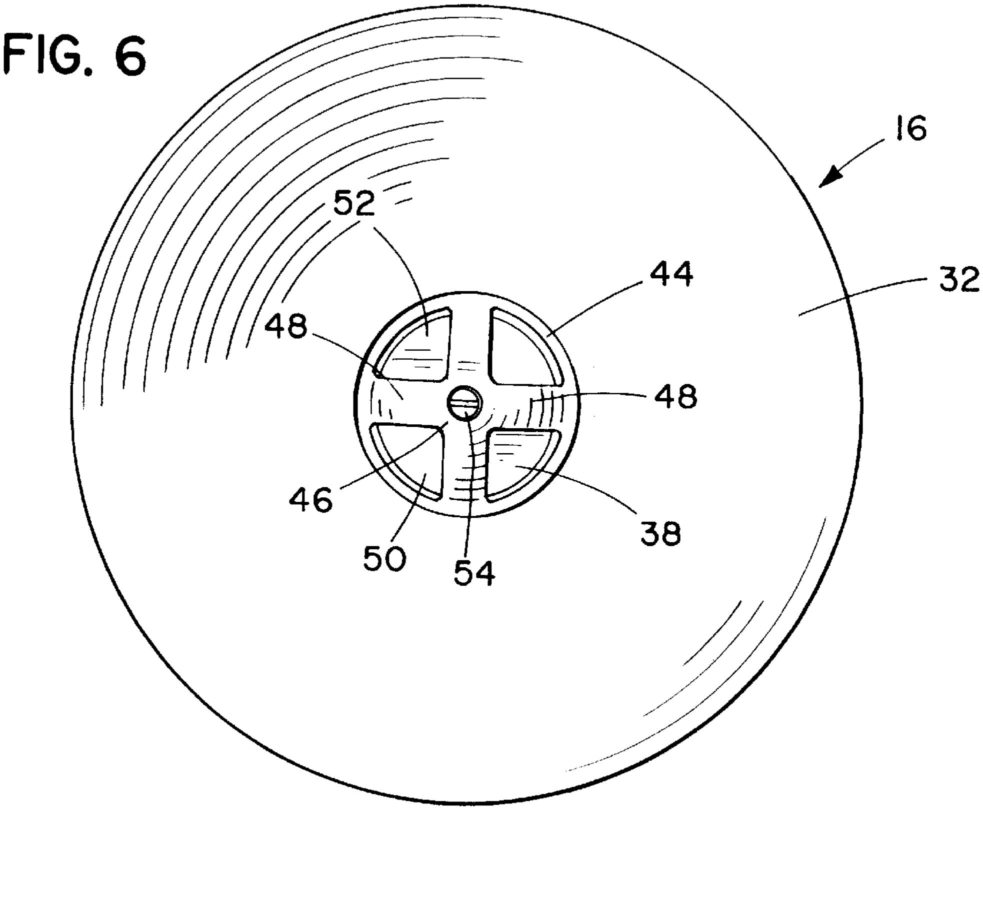
FIG. 6 is a bottom planar view of the dispensing fitment of FIG. 1.

Turning to the drawings, there is shown in FIGS. 1–4 an ink cartridge 10 of the type used for lithographic printing presses. The ink cartridge 10 comprises a hollow cylindrical body 12, a plunger 14 mounted in sliding engagement within one end of the cylindrical body 12, and a dispensing fitment 16 glued or otherwise affixed to the opposite end of the body 12.

In automated lithographic printing presses, the ink cartridge 10 is mounted within a cartridge carriage (not shown) with the dispensing fitment 16 facing down. During operation, the carriage moves laterally along the length of a fountain roller while an ink level sensor constantly monitors the amount of ink in the fountain roller to determine the exact locations where ink is needed. When a low level of ink is detected by the sensor, the controller activates an air supply which forces air against the pneumatically controlled plunger 14 slidingly engaged within the cartridge, which then forces ink onto the fountain roller.

The cylindrical body 12 has a plunger (filling) end (not shown) and a dispensing end that terminates in a rim 18. Preferably, the cylindrical body 12 is made of convolutely wound paper lined internally with polymeric material, although any suitable materials may be used, including, depending on the application, metal or plastic. In practice, the cylindrical body 12 typically is about nine or thirteen inches long, but any suitable length may be used depending on need.

The plunger 14 comprises a substantially circular disk portion 20 and a peripheral sidewall 22 extending upward therefrom (upward being defined as the direction away the dispensing end when the plunger 14 is inserted into the plunger end of the cylindrical body 12). The plunger 14 is inserted into the filling end of the ink cartridge 10 in sliding engagement with the inner wall of the cylindrical body 12 after the cartridge 10 is filled with ink.

A centrally disposed annular ring 24 protrudes from the circular disk 20 toward the dispensing fitment 16. The annular ring 24 has a substantially cylindrical outer wall 25 and a concave inner wall 26. and is adapted to fit within the space defined by the dispensing fitment cylindrical nozzle 42 when the plunger is fully depressed. The concave shape of the inner wall 26 is designed to accommodate the upwardly extending prongs 54 of the valve member 50 described below, allowing the plunger 14 to fit flush against the dispensing fitment 16 when the ink is fully dispensed from the cartridge 10, as shown in FIG. 4, thereby minimizing ink waste.

The dispensing fitment 16 is mounted in sealing engagement within the bottom end of the cartridge body 12. The fitment 16 may be glued to the inner wall of the cartridge body 12 or attached by any other suitable means. The dispensing fitment 16 is generally cup-shaped, and includes a flat covering portion 32, a sidewall 34 formed around the periphery of the covering portion 32, and an orifice 38 disposed in covering portion 32 through which ink can flow. A closure flange 36 extends radially outwardly from the bottom end of the sidewall 34. When the dispensing fitment 20 is fully inserted into the cylindrical body 12, the closure flange 36 abuts the rim 18 of the cylindrical body 12 to prevent further insertion of the dispensing fitment 16. The dispensing fitment 16 also has an optional stiffening wall 40 extending downward from the flat covering portion 32 and a substantially cylindrical nozzle 42 extending downward from the perimeter of the orifice 38 but not beyond a plane defined by the bottom surface of the flange 36. The nozzle 42 defines a substantially cylindrical space and may have a beveled rim 43.

In a key aspect of the invention, a flexible spring means 44 and valve member 50 are mounted within the space defined by the cylindrical nozzle 42. Preferably, the spring means 44 is formed of molded plastic and is held within an annular groove located along the inside of the nozzle 42. Alternatively, the spring means 44 may be formed as an integral part of the nozzle 42 and dispensing fitment 16 as shown in the figures. In the illustrated embodiment, the spring means 44 comprises a central portion 46 and bridge portions 48 extending between the central portion 46 and the nozzle 42. The central portion 46 has an opening therein, the purpose of which will now be explained.

A valve member 50 comprises a substantially rigid disk-shaped portion 52 and rearward or upward extending prongs 54. The valve member 50 is attached to the flexible spring means 44 by inserting the prongs 54 into the opening in the central portion 46 of the flexible spring 44. The diskshaped portion 52 may have a beveled edge 53 that abuts the beveled rim 43 of the cylindrical nozzle 42 when the valve member 50 is in the closed position.

The invention works in the following manner. In its relaxed, non-pressurized state (FIG. 3), the flexible spring 44 is concave, that is, bowed rearward (upward) in the direction of the plunger 14 (not shown in FIG. 3). When the flexible spring 44 is in this relaxed state, the valve member disk-shaped portion 52 is seated against the beveled edge or rim 43 of the nozzle 42 and ink cannot flow.

When pressure is exerted on the plunger 14 (indicated by arrows in FIG. 4), the plunger 14 is forced forward (downward) into the cartridge, causing the ink to exert pressure on the spring 44 and on the valve member diskshaped portion 52. When the ink pressure exceeds the biasing force of the spring 44, the valve member 50 moves forward, pulling the flexible spring 44 downward, and creating an annular opening 60 between the nozzle rim 43 and the valve disk-shaped portion 52 through which ink can flow, as shown in FIG. 4.

When the ink pressure force decreases below the biasing force of the spring, the flexible spring 44 returns to its original concave position, reseating the valve disk-shaped portion 52 against the nozzle rim 43 and automatically closing the valve.

An optional nozzle extension 62 (FIGS. 2 and 4) may be attached to the substantially cylindrical nozzle 42 extending from the dispensing fitment 16 via a snap-fit or other attachment means to help guide the flow of ink. An optional removable cap 64 (FIGS. 1 and 3) may be used to cover the valve member 50 when the cartridge 10 is not is use.

Without the optional nozzle extension 62 (but preferably with the optional cap 64 installed), the cartridge can be set on a flat surface with the dispensing end facing down. The cartridge can be stacked this way until ready for use.

Thus the present invention provides an ink cartridge having a self-closing valve that opens when subjected to pressure from the ink and closes automatically and completely when the pressure on the valve is decreased below a predetermined level, even when used with lower viscosity inks. The cartridge automatically dispenses ink when the plunger end is depressed, forcing ink through the annular opening 60 between the nozzle 42 and the valve member 50. When pressure on the plunger is reduced to a predetermined level, the valve automatically and completely closes. The present invention is particularly suitable as an ink dispenser for use with sheet fed lithographic presses having an automatic ink level sensor.

Other modifications and alternative embodiments of the invention are contemplated which do not depart from the spirit and scope of the invention as defined by the foregoing teachings and appended claims. It is intended that the claims cover all such modifications that fall within their scope.

We claim as our invention:

1. An improved ink cartridge used in lithographic printing presses, the ink cartridge comprising a hollow cylindrical body for holding a supply of extrudable ink, the cylindrical body having a dispensing end and a plunger end, the plunger end being closed by a plunger adapted to serve as a piston within the cylindrical body to extrude the contents of the dispenser when the plunger is forced toward the dispensing end, the dispensing end being closed by a dispensing fitment affixed thereto, the dispensing fitment comprising a flat covering portion, a sidewall formed around the periphery of the covering portion, and an orifice disposed in the covering portion, the improvement comprising:

a nozzle extending from the periphery of the orifice and having a rim, said nozzle defining a space;

a flexible spring means mounted within the space defined by the nozzle and having openings to accommodate the flow of ink therethrough; and a substantially rigid valve member located downstream of and supported by the flexible spring means, said valve member being moveable between a closed position in which the valve member is urged against the nozzle rim by the biasing force of the flexible spring means and an open position in which the valve member is below the nozzle rim to create an annular opening when pressure applied by the ink to the spring means and to the valve member exceeds the biasing force of the spring means.

2. The improved ink cartridge of claim 1 in which the flexible spring means is formed of molded plastic and is bowed rearward in the direction of the plunger when the valve member is in the closed position.

3. The improved ink cartridge of claim 2 wherein the flexible spring means is received in an annular groove located formed in the nozzle.

4. The improved ink cartridge of claim 1 wherein the valve member comprises a substantially flat disk-shaped portion and prongs extending from the disk-shaped portion in the direction of the plunger through a hole in the flexible spring means to secure the valve member to the spring means.

5. The improved ink cartridge of claim 4 wherein the nozzle rim is beveled and the flat disk-shaped portion has a beveled edge that engages the beveled nozzle rim when the valve member is in the closed position.

6. The improved ink cartridge of claim 1 in which the plunger comprises a substantially circular disk portion, a sidewall extending from the periphery of the disk portion in a direction away from the dispensing fitment, and means for minimizing ink waste, said minimizing means comprising an annular ring protruding from the circular disk portion in the direction of the dispensing fitment, said annular ring having an outer wall and a concave inner wall, said annular ring adapted to fit around the valve member prongs and within the space defined by the nozzle when the plunger is fully depressed.

7. The improved ink cartridge of claim 1 further comprising a nozzle extension removeably attached to the nozzle.

8. The improved ink cartridge of claim 1 further comprising a cap removeably attached to the nozzle.

9. The improved ink cartridge of claim 1 wherein the cylindrical body dispensing end terminates in a rim, the dispensing fitment further comprises a flange extending radially outward from the dispensing fitment sidewall and abutting the rim of the cylindrical body, the flange having a bottom surface defining a plane, and both the nozzle rim and the valve member in its closed position do not extend beyond the plane defined by the bottom surface of the flange.

* * * * *